| United States Patent Office | 3,549,496 |
|---|---|
| | Patented Dec. 22, 1970 |

3,549,496
PROCESS FOR MAKING HIGH MALTOSE SYRUP
Frederick C. Armbruster, La Grange, and William A. Jacaway, Jr., Downers Grove, Ill., assignors to CPC International Inc., New York, N.Y., a corporation of Delaware
No Drawing. Filed Oct. 24, 1966, Ser. No. 588,761
Int. Cl. A23l *1/08;* C12d *13/02*
U.S. Cl. 195—31      2 Claims

ABSTRACT OF THE DISCLOSURE

The present invention relates to an improved process for producing a starch hydrolysate having a high maltose content. A starch hydrolysate having a DE less than 20 is subjected to the hydrolytic action of *Bacillus polymyxa* amylase to produce a starch conversion product having a higher maltose content than DE value.

---

The present invention relates to an improved process for producing a starch hydrolysate having a high maltose content. More particularly, the present invention relates to an improved process for the enzymatic conversion of starch hydrolysates, to obtain high maltose syrups.

Maltose is a sweet-tasting disaccharide, whereas dextrose is a sweet monosaccharide. Maltose, like dextrose, is a reducing sugar. Its syrups, like the syrups of dextrose, inevitably contain other saccharides. High maltose syrups are valuable for many applications because they exhibit a decreased tendency to crystallize, as compared to high dextrose corn syrups, and tend to be non-hygroscopic.

Syrups having high maltose contents have previously been produced industrially by the saccharification of starch or starch hydrolysates with malt enzymes. The conversion action of malt enzymes results in the production of a conversion product in which maltose is the most abundant saccharide present. A typical prior art procedure, for making a high maltose syrup, involves solubilization of starch, followed by treatment with malt enzymes to saccharify the solubilized starch so as to obtain a starch hydrolysate having a high maltose content.

Suitable enzymes for this saccharification process have been limited to malt enzymes. The saccharification or conversion of the strach hydrolysate has usually been carried out with malt enzymes to a DE of between 35 and 55, depending upon the extent of conversion desired. DE is the abbreviation for dextrose equivalent and represents the total reducing sugars present expressed as dextrose in terms of percentage, dry basis.

The upper limit for economical malt saccharification is usually considered to be about 50 to 55 DE. Such a conversion liquor will usually contain 60% to 65% maltose. Saccharification to this extent is dependent upon the starch solubilization step employed. If high maltose syrups of greater than 55 DE are desired, further saccharification may be accomplished with other saccharifying enzymes such as fungal amylase. Such saccharifying enzymes will form predominantly dextrose from the saccharides present. Such a second saccharification step will usually result in a slight decrease in the total amount of maltose present but nevertheless yields syrups of high maltose content, which may be sweeter and usually contain a higher amount of fermentables than the conventional malt conversion syrup.

High maltose syrups have become increasingly important in commercial applications. Syrup compositions having a high maltose content furnish desirable non-hygroscopic properties to hard candies. They are also useful in controlling crystal formation in frozen desert formulations. Similarly, the high fermentables content of high maltose syrups is of value in the baking and brewing industries.

Although malt enzymes have been known and used for a long period of time and are expected to retain their importance in industry, it is desirable to find a substitute process, for use in place of the malt enzyme process for making high maltose conversion products of starch, that can produce high maltose syrups having equal or better properties than those produced by the malt enzyme process.

Accordingly, it is an object of the present invention to provide a novel process for producing high maltose starch conversion products in place of the prior art processes in which malt enzymes were used.

Another object of the present invention is to provide a novel process for the production of high maltose syrups having improved non-crystallizing characteristics.

A further object of the invention is to provide a practical process for the production of high maltose syrups, that is based on the use of an enzyme from a non-agrarian source.

Yet another object of the invention is to provide a novel process for the practical production of high maltose syrups, that is readily susceptible to scientific improvements to permit the development of operating economies.

Another object of the present invention is to provide a novel process for the production of high maltose syrups having substantially non-crystallizing characteristics and non-hygroscopic characteristics.

It is another object of the present invention to provide a practical process for the production of high maltose starch conversion products that are useful in the production of food products such as, for example, frozen deserts, that do not exhibit crystal formation under low temperature conditions.

Other objects of the present invention will be apparent hereinafter from the following description and from the recitals of the appended claims. All parts and percentages mentioned hereinafter are by weight, unless expressly stated to be otherwise.

The present invention provides a process for the preparation of a high maltose starch conversion product that comprises subjecting partially hydrolyzed starch, having a DE not exceeding about 20, to further conversion with *Bacillus polymyxa* amylase, to obtain a starch conversion product containing at least about 30% maltose. This conversion product can be concentrated, and refined also if desired, to produce a non-crystallizing, high maltose syrup. This syrup can be used to produce syrup solids of high maltose content, by concentration and drying of the high maltose syrup to a moisture content less than about 15%.

*Bacillus polymyxa* amylase is the maltogenic enzyme that is useful in the process of the present invention. It is produced by members of the bacterial species *Bacillus polymyxa* when suitably incubated under conditions of aerobic culture. The characteristics by which members of the spcies B. *polymyxa* may be distinguished are described by R. S. Breed, E. G. D. Murray, N. R. Smith et al., in "Bergey's Manual of Determinative Bacteriology," 7th edition, p. 625, published by Williams and Wilkins Co., Baltimore, 1957. However, it is well recognized by those skilled in the art that mutant strains may be isolated from time to time, that do not conform completely to this description.

The process of the invention will now be described in detail.

PARTIAL HYDROLYSIS OF STARCH

The partially hydrolyzed starch, that is used as the starting material in the present invention, is obtained by acid hydrolysis or enzyme hydrolysis of any conventional starch. Suitable starches include cereal starches such as corn, grain, sorghum, and wheat; waxy starches such as waxy milo and waxy maize; and root starches such as potato starch and tapioca starch. Crude starch sources may also be used, such as ground cereals, macerated tubers, or the partially purified starches therefrom.

Prior to hydrolysis, the starch is solubilized by gelatinization. Gelatinization is carried out by heating the starch to a temperature exceeding about 60° C. in the presence of moisture.

Acid hydrolysis of starch is carried out in a conventional manner to a DE not exceeding about 20, preferably to a DE between about 10 and about 20.

Enzyme hydrolysis of starch is carried out using suitable liquefying enzymes to attain a DE not exceeding about 20, preferably between about 5 and about 20.

The term "partially hydrolyzed starch," as used hereafter, refers to the acid or enzyme treated solubilized starch having a DE less than about 20.

PREPARATION OF ENZYME

The capacity to produce maltogenic enzyme is exhibited by substantially all strains of Bacillus polymyxa. The enzyme preparation identified as Bacillus polymyxa amylase is prepared by growing Bacillus polymyxa on appropriate media by submerged culture, stationary culture, or surface culture techniques at temperatures of from 20° C. to 40° C., for about 24 to 144 hours. A satisfactory medium will contain suitable amounts of organic or inorganic nitrogen sources such as, for example, corn steep liquor, yeast extract, dry yeast, beef extract, peptone, cottonseed or soybean meal and inorganic ammonium salts; carbon sources such as starch, modified starch, starch hydrolysates, and the like; and inorganic salts.

One method of producing the enzyme is described as follows. Cells from a slant culture of B. polymyxa ATCC 8523 were inoculated into a 500 ml. Erlenmeyer flask containing a sterile medium, composed of 4.0 grams ground yellow corn, 0.4 gram yeast extract, 0.5 gram calcium carbonate, and distilled water to 100 ml. The inoculated flask was incubated for 48 hours at 32° C. on a rotary shaker. A 10 ml. portion of the culture from this flask was aseptically introduced into a 1000 ml. Erlenmyer flask containing sterile production medium composed of 6.0 grams peptone, 1.0 gram yeast extract, 1.0 gram beef extract, 16 grams potato starch, 0.2 gram dipotassium phosphate and distilled water to 200 ml. The pH was adjusted to 7.2. The production flasks were incubated at 32° C. on a rotary shaker while the enzyme was produced and excreted into the culture medium. After 7 days fermentation, the contents of the flasks were filtered and the maltogenic enzyme, present in an amount equivalent to 0.2 unit per ml. as defined below, was recovered in the filtrate. This enzyme was then used in the filtrate form for the conversion of starch hydrolysates to high maltose products.

The level of enzyme activity present in B. polymyxa fermentation broths or enzyme concentrations was determined as follows. The enzyme substrate consisted of a 10% solution in water of a 15–18 DE spray-dried acid hydrolysate of corn starch. Exactly 50 ml. of the solution was pipetted into a 100 ml. volumetric flask. To the flask was added 5.0 ml. of a 1.0 molar, pH 6.5 phosphate buffer. The flask was then placed in a 40° C. water bath. After 10 minutes, an amount of enzyme containing 0.2 to 0.4 unit of activity, as defined hereafter, was added to the flask. At exactly 60 minutes after the enzyme addition, the reaction was stopped by adjusting the solution to a phenophthalein end point with one molar sodium hydroxide. The solution was then cooled to room temperature and diluted to volume. The reducing sugar value, calculated as dextrose, was determined on the diluted sample and on a control with no enzyme added. Maltogenic enzyme activity was calculated as follows.

$$A = \frac{S-B}{E}$$

wherein:

A=Maltogenic enzyme activity, units per ml. of enzyme preparation
S=Reducing sugar in enzyme converted sample in grams per 100 ml.
B=Reducing sugars in control in grams per 100 ml., and
E=Amount of enzyme preparation used, ml.

CONVERSION OF PARTIALLY HYDROLYZED STARCH

In the commercial production of high maltose syrups, it is common for the conversions to be performed at relatively high dry substance levels, usually within the range of about 15 to about 40%, to reduce tank size requirements and evaporation costs, and at relatively high temperatures such as, for example, about 50° C. to about 60° C., in order to retard or prevent microbial spoilage of the conversion liquors. Many enzymes are inhibited at high substrate concentrations and at high temperatures such as those mentioned above. Surprisingly however, Bacillus polymyxa amylase, prepared in accordance with the above, is quite amenable for use under the conditions required for successful and economical industrial operation for the production of high maltose conversion products from starch.

The preferred process for the use of the B. polymyxa amylase includes operation within the substrate conditions and conversion temperature ranges mentioned above; although the enzyme may be used to convert higher or lower substrate concentrations anywhere within the temperature range of about 30° C. to 70° C., if desired. The conversions may be performed within the pH range of about 4.5 to 8.0, the preferred range being 5.8 to 7.0. The time required for conversion of partially hydrolyzed starch to a high maltose starch conversion product will depend upon the enzyme dosage employed and the extent of conversion desired. However, desirable high maltose starch conversion products can be produced conveniently at reasonable enzyme dosages with 24 to 48 hour conversion periods.

The starch conversion products may be concentrated and/or refined to produce high maltose syrups. These syrups are substantially non-crystallizing and exhibit non-hygroscopic properties. In order to obtain these syrups, the starch conversion products are concentrated to a solids content in excess of 50%. The products may be refined by conventional methods such as carbon refining, ion exchange treatment, and the like, to obtain syrups that are substantially non-crystallizing and that have maltose contents between about 35% and about 65%, dry basis.

In the following operating examples, which illustrate the invention, all percentages are by weight, dry basis, and all temperatures are in degrees centigrade.

EXAMPLE 1

Production of high maltose conversion products

This example illustrates the use of Bacillus polymyxa amylase in the preparation of high maltose starch conversion products from partially acid-hydrolyzed starch.

This example also illustrates a preferred procedure for purifying and concentrating Bacillus polymyxa amylase, and for the application of the enzyme preparations obtained to convert a partially hydrolyzed starch to obtain high maltose starch conversion products. It demonstrates the effects of temperature and of enzyme concentration upon the conversion.

Bacillus polymyxa amylase preparation

A shake flash fermentation employing *Bacillus polymyxa* ATCC 8523 was conducted, following the previously described procedure. The culture filtrate obtained was adjusted to pH 6.8, agitated, and to it was added 1500 ml. acetone and 15 grams diatomaceous earth filter aid per 1000 ml. of culture filtrate. After agitation, the suspension obtained was then filtered, and the filtrate was discarded. The filter cake was suspended in a volume of water equivalent to one-tenth the volume of the original culture filtrate, and the resulting suspension was filtered, yielding a purified enzyme solution possessing approximately 10 times the activity per unit volume of the original culture filtrate.

Application of the Bacillus polymyxa amylase preparation to produce high maltose starch conversion products The purified enzyme concentrate thus obtained was employed to convert several separate portions of a 35% suspension of an acid hydrolyzed, 16 DE corn starch hydrolysate. This hydrolysate, nominally 16 DE, analyzed as follows:

| | |
|---|---|
| DE | 16.3 |
| Maltose content, percent d.b. | 4.2 |
| Yeast fermentables, percent d.b. | 10.7 |

The conversions were conducted at pH 6.0 to 6.5 and respectively at 40°, 50°, 55°, or 60° C., at enzyme dosages ranging from 1.1 to 33.6 units of maltogenic enzyme activity per 100 grams of substrate, dry substance basis. The conversions were terminated after 72 hours and the conversion products were then analyzed for DE, maltose by paper chromatography, and yeast fermentables. The results obtained were as follows:

TABLE 1

| | Conversion results | | | |
|---|---|---|---|---|
| | Enzyme dosage (units/100 g.d.s.) | D.E. | Maltose content (percent d.b.) | Yeast fermentables (percent d.b.) |
| Conversion temp. (° C.): | | | | |
| 40 | 4.2 | 40.9 | | |
| | 8.4 | 48.0 | 56.7 | 74.8 |
| | 16.8 | 53.9 | 59.5 | 78.6 |
| 50 | 1.1 | 38.2 | 43.7 | 60.4 |
| | 2.1 | 44.7 | 51.1 | 72.0 |
| | 4.2 | 48.0 | 55.0 | 75.7 |
| | 8.4 | 52.5 | 59.7 | 77.6 |
| | 16.8 | 56.3 | 61.4 | 79.0 |
| | 33.6 | 58.2 | 61.2 | 79.8 |
| 55 | 1.1 | 37.7 | 47.2 | 63.6 |
| | 2.1 | 40.1 | 50.4 | 70.4 |
| | 4.2 | 44.8 | 54.4 | 72.3 |
| | 8.4 | 47.4 | 53.3 | 75.5 |
| | 16.8 | 53.3 | 60.3 | 78.0 |
| 60 | 4.2 | 44.6 | 52.8 | |
| | 8.4 | 46.9 | 52.7 | |
| | 16.8 | 52.4 | 58.3 | |

As may be seen in Table 1, high maltose conversion products were obtained in every instance where the *Bacillus polymyxa* amylase was applied. It may also be seen that the enzyme dosage may be varied over a wide range.

EXAMPLE 2

Use of different enzyme preparations

This example demonstrates the use of several maltogenic enzyme preparations obtained from different strains of *Bacillus polymyxa*.

Several different strains of *Bacillus polymyxa*, obtained from the American Type Culture Collection or the Northern Regional Research Laboratories of the United States Department of Agriculture, were grown by shake flask culture procedures as described previously, using a sterilized production medium consisting of the following:

| | Grams |
|---|---|
| Defatted cooked cottonseed flour | 20 |
| Yeast extract | 2.0 |
| 16 DE acid hydrolysate of corn starch | 60 |
| $Na_2HPO_4$ | 1.42 |
| $KH_2PO_4$ | 1.36 |
| $MnSO_4 \cdot 7H_2O$ | 0.1 |
| Distilled water to 1000 ml. | | pH adjusted to 6.8 prior to sterilization.

After 5 days of fermentation, the suspended solids in the medium were removed by centrifugation, and the centrifugates were assayed for maltogenic activity. The results, when corrected for the amount of reducing sugars added with the enzyme sample, were as follows:

TABLE 2

| Culture | Enzyme activity (units/ml.) |
|---|---|
| *B. polymyxa* | |
| ATCC 12712 | 0.69 |
| NRRL 510 | 0.50 |
| ATCC 8524 | 0.33 |
| ATCC 8523 | 0.31 |
| ATCC 8519 | 0.29 |
| NRRL 510–R18 | 0.28 |
| ATCC 842 | 0.21 |
| ATCC 12060 | 0.18 |
| ATCC 8526 | 0.18 |
| ATCC 10401 | 0.10 |
| ATCC 8525 | 0.08 |
| ATCC 7070 | 0.01 |
| ATCC 7047 | 0.01 |

Several separate portions of acid-hydrolyzed starch, having the same analysis as in Example 1, were saccharified in accordance with the procedure of Example 1, using the enzyme preparations obtained in Table 2, respectively. The conversion temperature in each case was 55° C. The times and other conditions were otherwise the same as those of Example 1. The results appear in Table 3.

TABLE 3

| | Conversion results | | | |
|---|---|---|---|---|
| Culture | Enzyme dosage (units/100 g.d.s.) | D.E. | Maltose content (percent d.b.) | Yeast fermentables (percent d.b.) |
| ATCC 8523 | 1.25 | 38.5 | 39.8 | 55.2 |
| | 2.5 | 43.7 | 50.9 | 65.8 |
| | 5.0 | 45.8 | 55.5 | 72.6 |
| | 10.0 | 48.8 | 60.8 | 73.5 |
| ATCC 12712 | 1.25 | 42.9 | 48.8 | 64.7 |
| | 2.5 | 44.4 | 56.5 | 70.0 |
| | 5.0 | 46.0 | 54.4 | 72.3 |
| | 10.0 | 49.0 | 57.5 | 72.2 |
| NRRL 510 | 1.25 | 40.4 | 46.6 | 61.0 |
| | 2.5 | 43.4 | 52.3 | 68.8 |
| | 5.0 | 44.3 | 55.5 | 70.8 |
| | 10.0 | 46.4 | 62.0 | 73.4 |
| ATCC 842 | 1.25 | 41.8 | 51.5 | 62.6 |
| | 2.5 | 43.0 | 53.4 | 65.1 |
| | 5.0 | 43.1 | 48.7 | 66.5 |
| | 10.0 | 43.8 | 55.4 | 66.2 |

It will be noted that the different *Bacillus polymyxa* amylase preparations were substantially equally suitable for production of starch conversion products having relatively high maltose contents.

EXAMPLE 3

Use of a partially enzyme-hydrolyzed starch

This example illustrates the use of *Bacillus polymyxa* amylase to convert a partially hydrolyzed starch, obtained by enzyme hydrolysis, to a starch conversion product having a high maltose content.

Corn starch was suspended in water to obtain a 30% solids suspension. This suspension was heated to 85° C. and the pH adjusted to 7.5. An enzyme preparation identified as HT 440, a bacterial alpha amylase manufactured and sold by Miles Chemical Company, was added to the starch suspension at a dosage of 0.1% on a dry substance basis. After the starch had been partially hydrolyzed to a DE of between 18 and 20, the hydrolyzing action of the enzyme was terminated by heating the partially hydrolyzed starch to 121° C.

The partially hydrolyzed starch was cooled to 55° C., the pH adjusted to 6.5, and the *Bacillus polymyxa* amylase preparation of Example 1 was added as set forth in Table 4 below. The conversion mixture was then saccharified in accordance with the procedure of Example 1 for 24 hours.

TABLE 4

| | Conversion results | | |
|---|---|---|---|
| Enzyme dosage (units/ 100 g. d.s.) | D.E. | Maltose content (percent d.b.) | Yeast fermentables (percent d.b.) |
| 4.2 | 42.2 | 52.3 | ---------- |
| 8.4 | 45.9 | 54.3 | 78.1 |
| 16.8 | 49.6 | 59.8 | 79.8 |
| 33.6 | 53.9 | 62.4 | 81.4 |
| None | 19.1 | 7.0 | 18.7 |

This example illustrates the applicability of enzyme hydrolysis to obtain a partially hydrolyzed starch for use in the process of the present invention.

EXAMPLE 4

Production of syrup and solids

A high maltose conversion product was prepared in accordance with the procedure of Example 1, having a DE of 48.0, a maltose content of 55% and a yeast fermentables content of 75.7%, by using a conversion temperature of 50° C. and an enzyme dosage of 4.2 units/100 g.d.s. It was then refined with vegetable carbon and concentrated under vacuum to obtain a clear, sparkling, high maltose syrup.

This syrup exhibited non-crystallizing characteristics as well as non-hygroscopic characteristics. It contained 80% solids, of which 46% were maltose.

A portion of this syrup was then further concentrated to dryness. The resultant product was sweet, easily soluble in cold water, and was non-hygroscopic.

EXAMPLE 5

Enzyme action on high maltose conversion products

This example illustrates the use of *Bacillus polymyxa* amylase along with other saccharifying enzymes for the purpose of preparing high maltose starch conversion products having DE's in excess of 60. The dextrose contents of the final products do not exceed 45%, and the yeast fermentables are about 80% or more.

To a 30% by weight suspension of corn starch, there was added bacterial alpha amylase HT 1000 (a bacterial alpha amylase manufactured and sold by Miles Chemical Co.), at a dosage of 0.05% on a dry substance basis. The suspension was hydrolyzed at 90° C. at a pH of 7.2 to 8.1 DE. The enzymatic action was terminated by heating the partially hydrolyzed starch to 121° C. The hydrolysis product contained 0.7% d.b. dextrose and 1.3% d.b. maltose.

The partially hydrolyzed starch was cooled to 55° C., adjusted to a pH of 6.5, and converted with *Bacillus polymyxa* amylase as described in Example 1. After 48 hours of conversion, the enzyme activity was destroyed by heating. The conversion product contained 1.3% dextrose, 66.0% maltose, and 78.1% yeast fermentables on a dry basis. The conversion liquor was then further converted with a glucoamylase preparation at 55° C. at a pH of 4.5.

Glucoamylase is a glucogenic enzyme produced by many species of microorganisms, such as *Aspergillus niger*, *Aspergillus phoenicis*, *Rhizopus delemar*, *Aspergillus oryzae*, *Rhizopus niveus*, *Clostridium acetobutylicum* and *Endomyces* sp., when grown on suitable media under appropriate conditions. A suitable procedure for the preparation of glucoamylase and a means for determining glucoamylase activity are described in U.S. Pats. 3,012,944 and 3,042,584. For maximum fermentables production during saccharification, it is desirable to use glucoamylase preparations that are devoid of transglucosidase activity. U.S. Pat. 3,042,584 discloses a procedure for removing transglucosidase from glucoamylase preparations.

The results of several exemplary conversions of this kind are shown below in Table 5.

TABLE 5

| D.E. after initial thinning with alpha amylase | D.E. after conversion with *B. polymyxa* | Glucoamylase conversion | | Composition of the final conversion product (percent d.b.) | | |
|---|---|---|---|---|---|---|
| | | (Units per 100 g. d.s.) | Time (hours) | D.E. final | Dextrose | Maltose | Yeast fermentables |
| 8.1 | 47.1 | 2.0 | 48 | 60.0 | 23.0 | 58.3 | 81.4 |
| 8.1 | 47.1 | 2.0 | 72 | 65.4 | 35.6 | 47.9 | 82.9 |
| 8.1 | 47.1 | 4.0 | 24 | 59.1 | 25.6 | 56.5 | 80.0 |
| 8.1 | 47.1 | 4.0 | 48 | 70.0 | 46.1 | 39.4 | 83.6 |
| 8.1 | 47.1 | 6.0 | 24 | 64.0 | 33.6 | 49.0 | 82.6 |
| 8.1 | 47.1 | 8.0 | 24 | 69.7 | 44.4 | 40.6 | 83.6 |

This example illustrates the compositions of the starch conversion products that are attainable in accordance with the invention. As the data demonstrate, the further conversions of the starch conversion products from *B. polymyxa* amylase can be carried out without substantial loss of the maltose content, while simultaneously obtaining high yeast fermentables contents.

The products produced in accordance with this invention, whether relatively dilute conversion products, syrups, or dry solids, are essentialy indistinguishable from those obtained as a result of malt saccharification, on the basis of saccharide composition.

The present discovery, that high maltose conversion products may be produced by the action of a bacterially derived maltogenic enzyme preparation without a concomitant alteration of product saccharide composition, is advantageous in that it eliminates the previous dependency upon the plant-derived malt enzymes utilized heretofore. Although the malt enzymes have been known and used for generations, and will undoubtedly continue to be of importance for many years to come, in this era in which populations are expanding and the acreages available to agriculture are shrinking, the significance and importance of alternate nonagrarian processes is obvious. Furthermore, the very short generation times that microorganisms possess, in contrast to cereal crops, for example, makes them particularly well suited for mutational studies and related work designed for the procurement of superior enzyme producing strains. It is therefore to be expected that as a result of successful strain selection programs, the bacterially derived maltogenic enzyme system can be made in much more economical fashion than is possible at present.

Products made in accordance with this invention are useful wherever the comparable products, made by the use of malt enzymes, have been or can be employed, and are particularly attractive for use in the baking and brewing industries, especialy if further converted by glucoamylase.

While the invention has been described in connection with specific embodiments thereof, it will be understood that it is capable of further modifications, and this application is intended to cover any variations, uses, or adaptations of the invention following, in general, the principles of the invention set forth, and including such departures from the present disclosure as come within known or customary practice in the art to which the invention pertains and as may be applied to the essential features hereinbefore set forth, and as fall within the scope of the invention and the limits of the appended claims.

We claim:

1. A process for the mass production of a non-crystallizing high maltose syrup that contains at least 35% maltose, dry basis, and that has a numerically higher maltose content, expressed as a percentage by weight dry basis on total solids, than its DE value, comprising:
    subjecting a starch hydrolysate having a solids content of at least 15% by weight and a DE from about 5 to about 20 to the action of the amylase of *Bacillus polymyxa* at a temperature in the range from about 30° C. to about 70° C., and at a pH in the range from about 4.5 to about 8.0, for at least about 24 hours, to obtain
    a conversion product containing at least 35% by weight maltose on a dry basis, and then producing a non-crystallizing maltose syrup containing at least 50% solids.

2. A process in accordance with claim 1, wherein the starch hydrolysate has a DE from about 10 to about 20 and a solids content from about 15% to about 40%, and the action of the amylase is carried out at a temperature in the range from about 50° C. to about 60° C. and a pH in the range from about 5.8 to about 7.0, for from about 24 to about 72 hours, and the conversion product contains at least about 50% by weight maltose on a dry basis.

References Cited
UNITED STATES PATENTS

| | | | |
|---|---|---|---|
| 3,067,066 | 12/1962 | Ehrenthal et al. | 195—31 |
| 3,100,740 | 8/1963 | Bond | 195—31 |
| 3,265,586 | 8/1966 | Land et al. | 195—31 |
| 3,329,578 | 7/1967 | Faucett | 195—31 |

OTHER REFERENCES

Industrial Microbiology—3rd edition 1959—McGraw-Hill Book Co., Prescott & Dunn, pp. 497–503.

Reed et al., "Enzymes in Food Technology," p. 261, Academic Press, New York, N.Y., 1966.

Robyt et al., Archives of Biochemistry and Biophysics, vol. 104, pp. 338–345, 1964.

LIONEL M. SHAPIRO, Primary Examiner

U.S. Cl. X.R.

99—142